United States Patent
Zhong et al.

(10) Patent No.: US 11,704,225 B2
(45) Date of Patent: Jul. 18, 2023

(54) ADAPTIVE, SPECULATIVE, AGENT-BASED WORKLOAD GENERATION

(71) Applicant: International Business Machines Corporation, Armonk, NY (US)

(72) Inventors: Jason Zhong, Monterey Park, CA (US); Matthias Seul, Pleasant Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/143,346

(22) Filed: Jan. 7, 2021

(65) Prior Publication Data

US 2022/0214960 A1 Jul. 7, 2022

(51) Int. Cl.
    G06F 11/36 (2006.01)
(52) U.S. Cl.
    CPC ...... *G06F 11/3612* (2013.01); *G06F 11/3608* (2013.01); *G06F 11/3664* (2013.01)
(58) Field of Classification Search
    USPC ......................................................... 717/135
    See application file for complete search history.

(56) References Cited

U.S. PATENT DOCUMENTS

| | | | |
|---|---|---|---|
| 6,654,699 B2 | 11/2003 | Millard | |
| 8,510,600 B2 | 8/2013 | Broda et al. | |
| 8,726,243 B2 | 5/2014 | Nasuto et al. | |
| 8,910,128 B2 | 12/2014 | Kutlu | |
| 9,152,532 B2 | 10/2015 | Breternitz et al. | |
| 9,304,891 B1* | 4/2016 | Angleton | G06F 11/3668 |
| 10,353,809 B2 | 7/2019 | Kshirsagar | |
| 10,360,138 B2 | 7/2019 | Conti et al. | |
| 10,642,718 B2 | 5/2020 | Shah et al. | |
| 2005/0216234 A1* | 9/2005 | Glas | G06F 11/3414 702/186 |
| 2005/0278458 A1* | 12/2005 | Berger | G06F 16/27 709/248 |

(Continued)

FOREIGN PATENT DOCUMENTS

WO   WO2019162859 A1   8/2019

OTHER PUBLICATIONS

"Apache Jmeter," accessed Nov. 30, 2020, 2 pages. https://jmeter.apache.org/.

*Primary Examiner* — Jason D Mitchell
(74) *Attorney, Agent, or Firm* — Yee & Associates, P.C.

(57) ABSTRACT

Load testing a service having a plurality of different states is provided. A multitude of simulated users accessing the service are divided into a plurality of cohorts. Simulated users within a given cohort share a similar personality type. A load test of the service is performed by applying a set of service requests from each respective cohort to the service. In response to a percentage of simulated users of each cohort encountering a particular state in the service, a user response is determined for the percentage of simulated users within each cohort at that particular state based on a probabilistic user behavior model corresponding to a personality type of each cohort such that user responses at that particular state are distributed in accordance with the probabilistic user behavior model. Distributed user responses at that particular state are applied to the load test in accordance with the probabilistic user behavior model.

20 Claims, 7 Drawing Sheets

(56) References Cited

U.S. PATENT DOCUMENTS

| | | | |
|---|---|---|---|
| 2009/0037914 A1* | 2/2009 | Chagoly | G06F 11/3006 718/101 |
| 2011/0054841 A1* | 3/2011 | Wang | G06F 11/3414 702/182 |
| 2011/0295801 A1 | 12/2011 | Dias et al. | |
| 2013/0054792 A1 | 2/2013 | Sharaf | |
| 2016/0062880 A1* | 3/2016 | Moretto | G06F 11/3672 714/38.1 |
| 2016/0156657 A1* | 6/2016 | Kaplan | H04L 63/1458 726/25 |
| 2016/0188445 A1* | 6/2016 | Hermeto | G06F 11/3684 714/38.1 |
| 2017/0046254 A1* | 2/2017 | Buege | G06F 11/3684 |
| 2017/0177416 A1 | 6/2017 | Altman et al. | |
| 2017/0315902 A1* | 11/2017 | Moretto | G06F 11/3688 |
| 2018/0300221 A1* | 10/2018 | Barbee | G06F 11/3612 |
| 2019/0129827 A1* | 5/2019 | Ramasamy | G06F 11/3664 |

* cited by examiner

BEHAVIOR
DISTRIBUTION TABLE
400

| INPUT STATE | DISTRIBUTION | OUTPUT STATE |
|---|---|---|
| 200, <50 ms | 0.9 | CONTINUE URL LIST |
| 200, <50 ms | 0.05 | REPEAT PREVIOUS REQUEST |
| 200, <50 ms | 0.05 | SWITCH TO RANDOM OTHER CONDITION |
| 200, >500 ms | 0.4 | REPEAT PREVIOUS REQUEST |
| 200, >500 ms | 0.3 | REPEAT PREVIOUS REQUEST, BYPASS CACHE |
| 200, >500 ms | 0.2 | SWITCH TO TIMEOUT CONDITION |
| 200, >500 ms | 0.1 | SWITCH PERSONA TO "EXCESSIVE CLICKER" |
| ⋮ | ⋮ | ⋮ |

402 — INPUT STATE
404 — DISTRIBUTION
406 — OUTPUT STATE
408 — OK (first three rows)
410 — SLOW (next four rows)

FIG. 4

ADAPTIVE, SPECULATIVE, AGENT-BASED WORKLOAD GENERATION

BACKGROUND

1. Field

The disclosure relates generally to online services and more specifically to load testing an online service using a plurality of simulated user cohorts having different personality types to simulate unpredictable, adaptive behavior of a multitude of real-world users under different load scenarios.

2. Description of the Related Art

In computer networking, an online service is an application, which runs at the network application layer and above, providing, for example, data storage, manipulation, presentation, communication, or other functionalities. The online service is often implemented using a client/server architecture based on the application layer network protocols. The online service is usually provided by a server component running on one or more computers and accessed via a network by client components running on other devices.

SUMMARY

According to one illustrative embodiment, a computer-implemented method for load testing a service having a plurality of different states is provided. A computer divides a multitude of simulated users accessing the service concurrently into a plurality of cohorts. All simulated users within a given cohort of the plurality of cohorts share a similar personality type that is representative of how a corresponding group of real-world users respond to the plurality of different states of the service. The computer performs a load test of the service by applying a set of service requests coming from each respective cohort in the plurality of cohorts to the service. In response to a percentage of simulated users of each respective cohort encountering a particular state in the service during the load test, the computer determines a user response for the percentage of simulated users within each respective cohort at that particular state based on a probabilistic user behavior model corresponding to a personality type of each respective cohort such that user responses at that particular state are distributed in accordance with the probabilistic user behavior model. The computer applies distributed user responses at that particular state in the service to the load test in accordance with the probabilistic user behavior model. According to other illustrative embodiments, a computer system and computer program product for load testing a service having a plurality of different states are provided.

BRIEF DESCRIPTION OF THE DRAWINGS

FIG. 4 is a diagram illustrating an example of a behavior distribution table in accordance with an illustrative embodiment;

DETAILED DESCRIPTION

Figure 1:
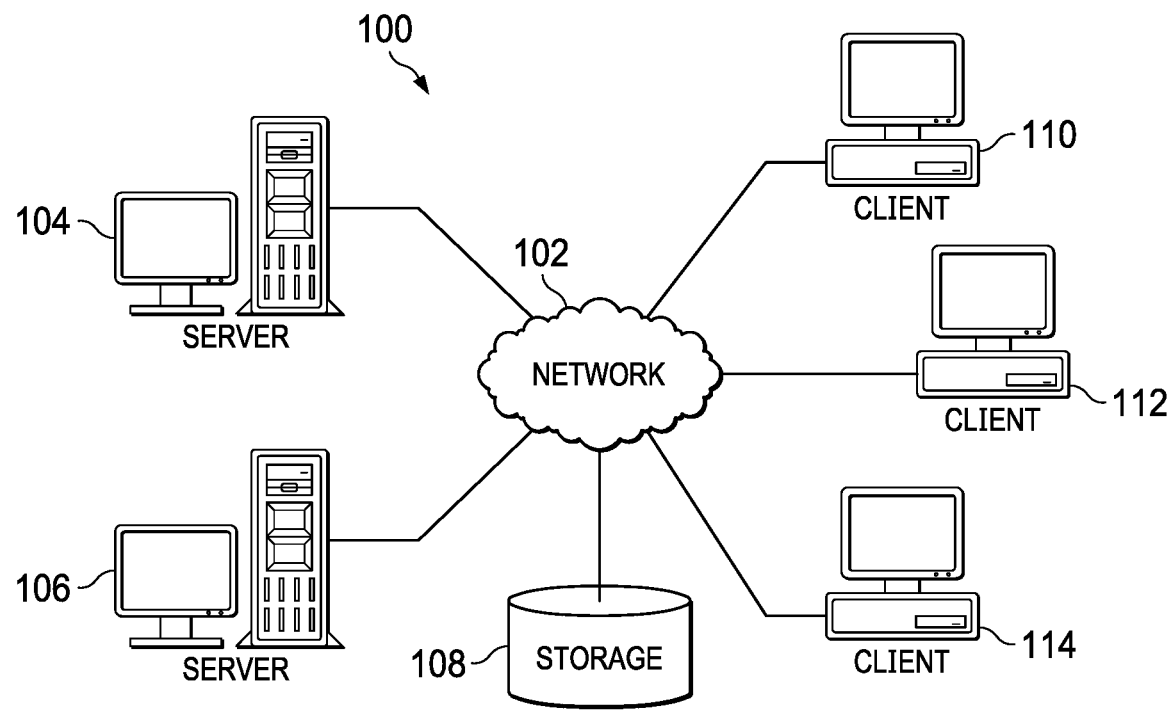
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
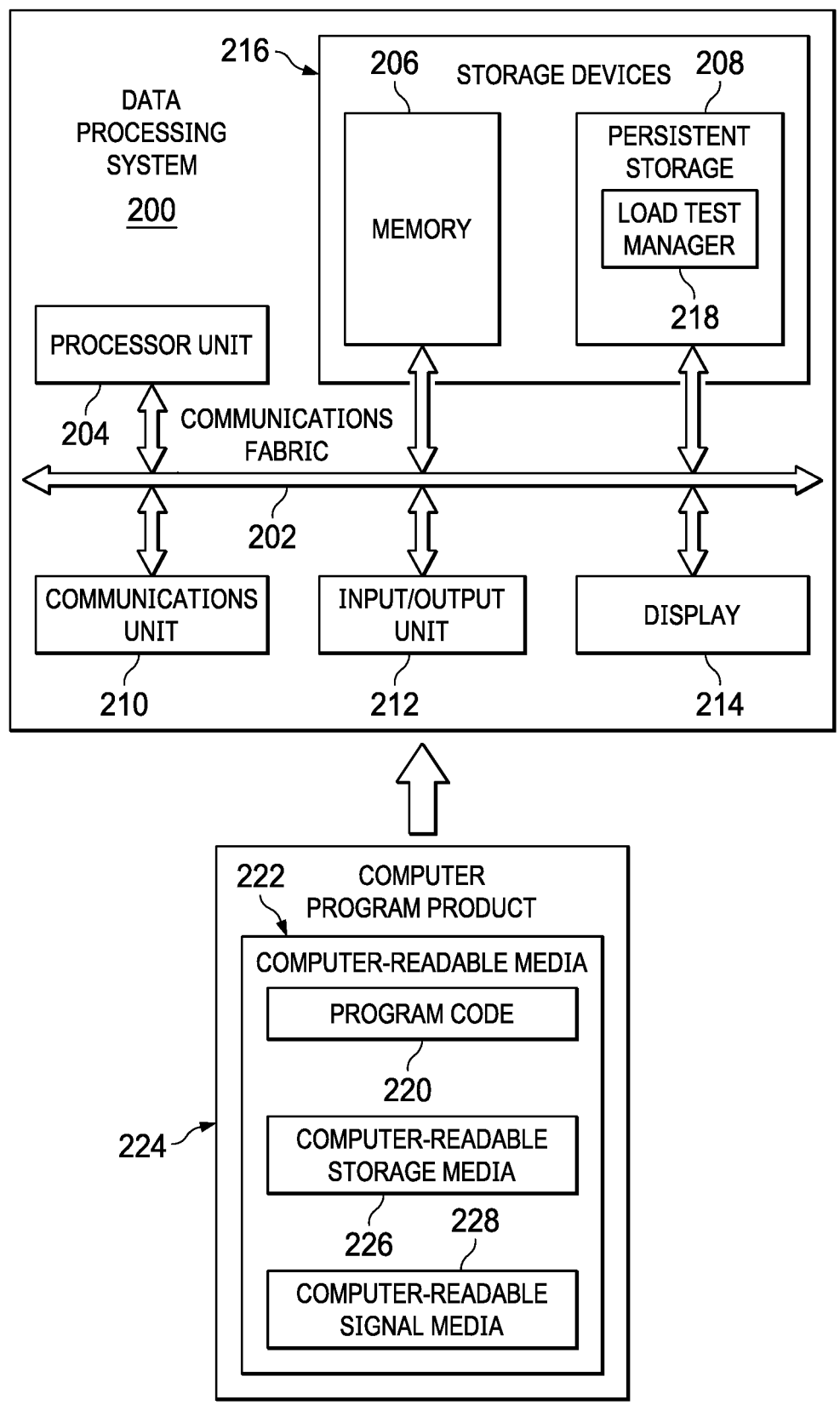
FIG. 2 is a diagram of a data processing system in which illustrative embodiments may be implemented.
Figure 3:
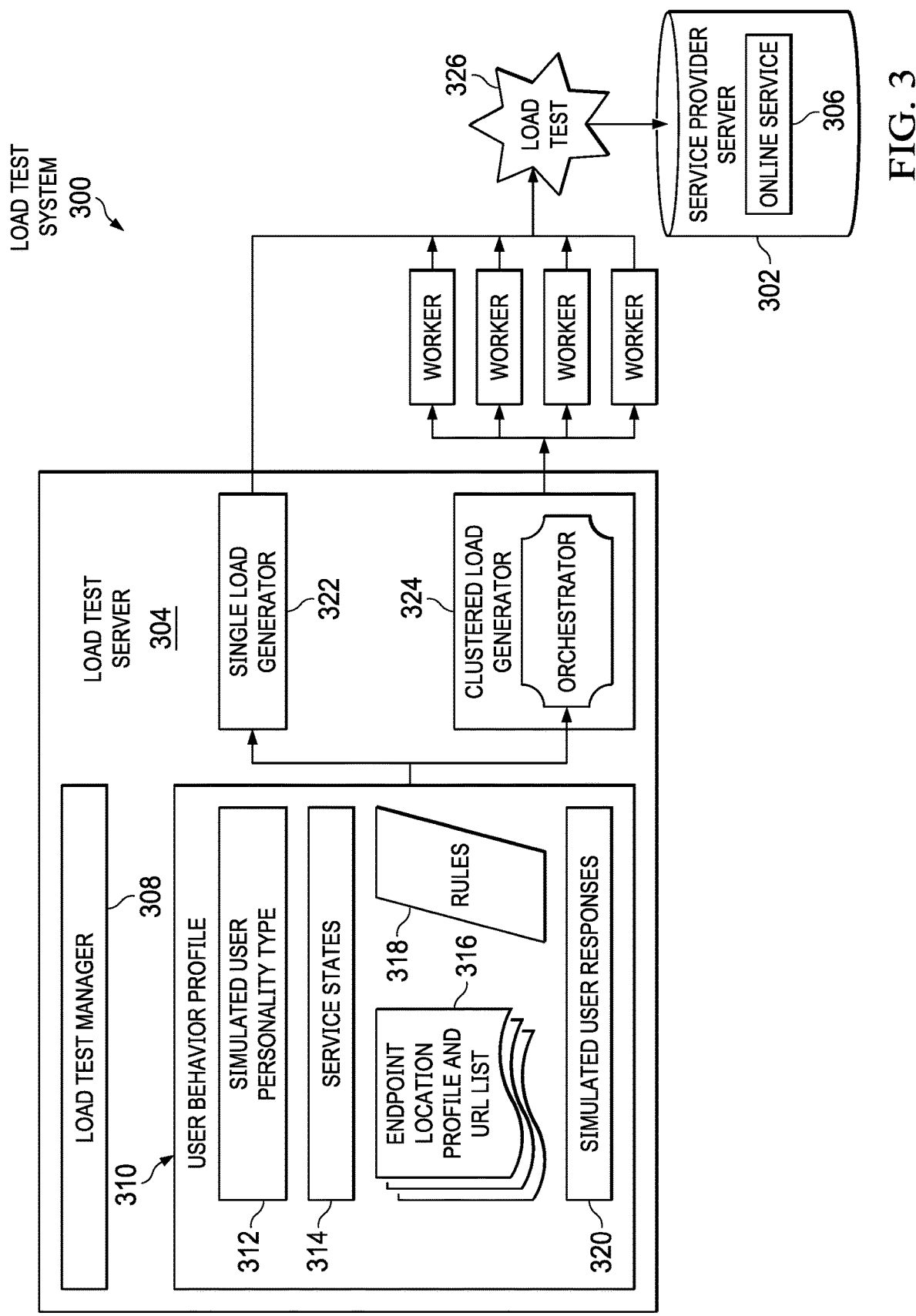
FIG. 3 is a diagram illustrating an example of a load test system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Server 104 is a service provider server that provides one or more online services, such as, for example, gaming services, financial services, banking services, governmental services, educational services, reservation services, data services, entertainment services, event monitoring services, and the like, to client devices. Server 106 is a load test server that provides load testing services for the one or more online services hosted by server 104.

Load testing generally refers to the practice of modeling expected usage of the online services by simulating multiple users accessing the services concurrently. Load testing measures the services' performance in terms of quality of service based on actual user behavior. Load testing tools may follow a load testing paradigm of using a script recorder to record user interactions when users access a service and create user interaction scripts. A load generator replays the user interaction scripts, which may be modified with different test parameters before replay. During script replay, the load generator monitors and collects hardware and software statistics corresponding to the service. The statistics may include, for example, CPU usage, memory usage, disk input/output, service response time, service throughput, network latency, and the like. The load generator then analyzes all of these statistics and generates a load testing report corresponding to the service.

It should be noted that server 104 and server 106 may each represent one or more clusters of servers in one or more data centers. Alternatively, server 104 and server 106 may each represent multiple computing nodes in one or more cloud environments. Further, server 106 may send an adaptive, speculative, agent-based service request workload to server 104 to load test one or more of the online services hosted by server 104.

Client 110, client 112, and client 114 also connect to network 102. Clients 110, 112, and 114 are clients of server 104. In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart glasses, smart televisions, smart appliances, gaming devices, kiosks, and the like, with wire or wireless communication links to network 102. Users of clients 110, 112, and 114 may utilize clients 110, 112, and 114 to access and utilize the online services provided by server 104.

Storage 108 is a network storage device capable of storing any type of data in a structured format or an unstructured format. In addition, storage 108 may represent a plurality of network storage devices. Further, storage 108 may store identifiers and network addresses for a plurality of different service provider servers, identifiers for a plurality of different online services, a plurality of different user behavior profiles, a plurality of different endpoint location profiles, a plurality of predefined states for online services, a plurality of predefined user responses to different service states, predefined rule sets, predefined behavior distributions, and the like. Furthermore, storage 108 may store other types of data, such as authentication or credential data that may include user names, passwords, and biometric data associated with system administrators and service operators, for example.

In addition, it should be noted that network data processing system 100 may include any number of additional servers, clients, storage devices, and other devices not shown. Program code located in network data processing system 100 may be stored on a computer readable storage medium or a set of computer readable storage media and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 106 in FIG. 1, in which computer readable program code or instructions implementing the load testing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Furthermore, a computer readable storage device or a computer readable storage medium may represent a set of computer readable storage devices or a set of computer readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores load test manager 218. However, it should be noted that even though load test manager 218 is illustrated as residing in persistent storage 208, in an alternative illustrative embodiment load test manager 218 may be a separate component of data processing system 200. For example, load test manager 218 may be a hardware component coupled to communication fabric 202 or a combination of hardware and software components.

Load test manager 218 controls the process of performing load tests on online services using cohorts of simulated users having a plurality of different personality types that responds differently to different states of the online services to simulate unpredictable, adaptive behavior of real-world users under different workload scenarios. As a result, data processing system 200 operates as a special purpose computer system in which load test manager 218 in data processing system 200 enables adaptive, speculative, agent-based workload generation for online service load testing. In particular, load test manager 218 transforms data processing system 200 into a special purpose computer system as compared to currently available general computer systems that do not have load test manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

One important aspect of online services is service availability. Service availability not only means binary "service up"/"service down" conditions, but also quality of service regarding user interactions, expressed through factors, such as, for example, service responsiveness, proper service answers, and the like. Therefore, determining how and under which circumstances a given service will break is an important consideration for identifying potential software issues, bottlenecks, and design weaknesses. Determining a service's scalability allows operators to plan for the amount of resources needed to prevent a service from going down during critical times.

However, as services increasingly become based around microservice components and distributed system setups, finding the optimum assignment of resources becomes increasingly complex as there are many factors to consider. If a given service provider does not want to spend money on excess resources or risk spending the resources on the wrong part of a service, then measurement of different scenarios is important. This goes beyond just simply pushing a service with a large number of service requests. If a service is under load from actual users, the behavior of those users may change given the service's current state or status, which may introduce unexpected service load scenarios.

Load generators may be designed to put as much pressure on a given service access point as possible. Some may allow a mixture of service requests or distribution of the service requests across different components. Other load generators may allow "hammering" of service components identified as struggling by sending even more service requests, getting the service components to a fail state faster.

However, such load generators do not model a service's active userbase, but merely replay a given user interaction script scaled up by a number of threads. As a result, these load generators will not identify unexpected issues arising from changing behaviors in thousands of individually acting users. Thus, these load generators may leave operators without a realistic indication of a service's reliability and performance under load. Services should generally be resilient and scale to changing user behaviors.

Illustrative embodiments utilize a rule-based process that profiles or models user behavior patterns (i.e., personality types), combines or folds same or similar profiles of user behavior patterns into a single simulated user agent, and then runs and adjusts load testing based on rules evaluating each run's results. Illustrative embodiments utilize a probabilistic (i.e., statistical) user behavior profile or model that determines a given user's likely behavior when certain service conditions are met. By folding user behavior patterns into a single simulated user agent (e.g., a cluster of 5000 simulated users with a similar behavior/personality type) and predefining user responses to certain service conditions (e.g., slow service response times), illustrative embodiments allow for reactive switching to changing user behavior without the overhead of simulating each particular user in an entire cohort of simulated users. This reactive switching allows illustrative embodiments to simulate unpredictable, adaptive behavior of many users under different load scenarios efficiently, enabling an operator to identify and remediate service issues, such as, for example, network latency, bottlenecks, software defects, and the like, that are difficult to find using static load testing only.

Illustrative embodiments may utilize aspects of existing load generator technology, such as, for example, Apache JMeter, to create, manage, and execute service requests. Illustrative embodiments prepare service requests before running a service request load test and interpret results of the load test runs live in real time.

Illustrative embodiments are capable of generating user behavior profiles of different user personalities. A user personality is a consistent set of user behavior or style of interacting with an online service. These user behavior profiles define a plurality of states corresponding to a user's visit to a given service, such as, for example, "Login", "Get XYZ", "Run ABC", and "Log Out". Furthermore, these user behavior profiles define user behavior in error conditions, such as, for example, "Slow Service Response Time", "Service Unresponsive", and the like.

Illustrative embodiments map the different states corresponding to a user's visit to a given online service to a set of rules that trigger certain predefined user responses (i.e., probability-based user behavior in response to certain conditions) within a user behavior profile. As a result, a user behavior profile works like a state-machine, with specific states (e.g., conditions) causing a predefined user response based on a set of defined rules. Illustrative embodiments feed the results of a given user response to a particular condition back into the state-machine. Illustrative embodiments combine the states and rules with certain variables, such as, for example, "What service response time is considered slow?", "How often will a service request be tolerated to fail before an error state is entered?", "Does user behavior escalate and how quickly?", "How fast does a user interact with the service in general?", and the like, to comprise a user behavior profile.

For example, illustrative embodiments may generate a user behavior profile called an "Excessive Clicker" user behavior profile. The simulated user corresponding to this particular user behavior profile wants to get in and out of a service quickly, does not want to linger too long on any given page of the service, and expects high responsiveness from the service. Thus, when delays between different user interactions with the service are low, that particular user behavior profile may issue only a smaller number of service requests when everything functions okay and user tolerance for slowness is very low. If the user behavior profile encounters an error state, then the user behavior profile may issue a large number of in-page user interactions (e.g., triggering several links and/or buttons on the page) before starting to force-refresh the page rapidly. If this set of user interactions with the service does not yield results within a few seconds, then the user behavior profile may logout and try to login again, repeating the logout/login process as fast as possible, and potentially also "multiplying", which simulates the user opening different browser windows and tabs or trying from different devices. An operator can configure the list of uniform resource locators (URLs) corresponding the set of user interactions within the user behavior profile, specifying what part of the service, application programming interface, or the like is triggered for each state and under what conditions. Illustrative embodiments execute the URL list for a given condition until either the given condition is switched to a different condition or execution of the URL list is completed. It should be noted that a cohort can be in different conditions that determine which user responses or behaviors are available to execute for different service states. A condition defines specific sets of user responses or behaviors to different service states, such as, for example, "all okay", "error", "slow", "complete", and the like, within a single user personality (i.e., user behavior profile). A user behavior profile bundles the sets of user responses or behaviors to simulate or mimic a particular type of real-world user.

As a result, user behavior profiles can be hand-tailored, predefining states and setting thresholds for user responses or behaviors. Illustrative embodiments can also define user responses to certain conditions by ingesting real-world user logs corresponding to a given service, clustering similar in-session user behavior to determine common user behavior patterns, such as, for example, user click-streams within the given service, user response to a given service condition (e.g., what happens when the service response time is slow, when service errors are encountered, and the like), and delays between user responses. It should be noted that the ingested user logs for the service do not need to provide a specific user clickstream, as long as the clickstream is a common user clickstream that can be seen across a given cluster of users. This approach would allow illustrative embodiments to learn from changes in user behavior and be adaptive to new services.

Illustrative embodiments can select a particular set of user behavior profiles that illustrative embodiments can utilize to simulate a given service's userbase. Illustrative embodiments may also assess and analyze compatibility of the selected set of user behavior profiles with new user groups that may show a difference in user behavior.

Moreover, illustrative embodiments may include live network simulation. This live network simulation takes into account how a real-world service would encounter delays, packet loss, jitter, routing issues, and the like. Instead of the live network simulation being universal and static, illustrative embodiments can assign different endpoint location profiles and encountered service issues for a given user behavior profile or cohort of simulated users. Furthermore, illustrative embodiments may utilize sensors to measure network latency between a set of endpoints that utilize the online service and incorporate this measured network latency into a load test. For example, illustrative embodiments may have outbound network traffic from endpoints in a particular geographic region be slower during working hours for that geographic region. Additionally, for a worldwide online service, illustrative embodiments can define different load test run cycles to run at different times of the day (also known as, staggered start) to simulate real-world workload coming from different regions of the world, and within a certain time period of the day, several workloads may be running concurrently from several different regions to simulate a peak workload scenario.

After illustrative embodiments generate these user behavior profiles and endpoint location profiles, illustrative embodiments then generate a cohort of simulated users (i.e., a multitude of simulated users having a given personality type for responding to and interacting with different states of an online service). In other words, each cohort includes a large number of simulated users having a similar user behavior profile (e.g., 5000 simulated users having an "Excessive Clicker" user behavior profile). For each user behavior profile, illustrative embodiments compile a resulting list of URLs and service request options corresponding to a set of defined service states of an online service, allowing illustrative embodiments to quickly call upon different URLs with variation without having to run the same rules again and again during load testing of the online service. Illustrative embodiments then generate a set of service requests (e.g., a "service request chunk") coming from a given cohort of simulated users, which illustrative embodiments process in the next load test run cycle. The service request chunk represents a set of service requests corresponding to all of the simulated users of that particular cohort. The first service request chunk starts with a "previous service request chunk okay" state. Illustrative embodiments generate a service request chunk for each respective cohort of simulated users to be deployed in a load test run cycle.

After illustrative embodiments generate all service request chunks for the different cohorts of simulated users to be deployed in a load test run cycle, illustrative embodiments start the load test run cycle, which consists of running the generated service request chunks against the service and recording, for example, what was the result of the service request chunk (e.g., return code, light checking of response body, and the like), what was the network latency, and the like.

Illustrative embodiments cluster service request results of the load test run cycle into broad categories, such as, for example: all okay, fast; okay, but slow; wrong result, fast; wrong result, slow; service error, fast; service error, slow; unresponsive/timeout (always slow); and the like. For each respective cohort's service request chunk, illustrative embodiments wait a predefined amount of time (e.g., 500 milliseconds) and then calculate the distribution of each load test run cycle results. For example, the distribution of a load test run cycle result may be: 98% of the service requests were "all ok, fast"; 1% were "okay, but slow"; and 1% are still pending. Illustrative embodiments place any pending service requests in a pending service request queue for the next load test run cycle and record how many service requests are still in that pending state.

Then, illustrative embodiments map the load test run cycle results to the predefined user response rules, which determine the next URL (i.e., service request) that should be issued for the next service state. For this determination, illustrative embodiments do not make individual decisions for each simulated user in a given cohort, but rather make a decision that will apply to a given percentage of the load test run cycle results. For example, if there are 5000 simulated users in the cohort and 98% of all service request results in the corresponding service request chunk are "all okay, fast", then illustrative embodiments, for 4900 of those 5000 simulated users, apply the corresponding rule to determine what the predefined user response will be for the "all okay, fast" service request results. This determination can be strictly deterministic, yielding the same results for a given outcome, or it may be probabilistic to introduce more variability. For example, illustrative embodiments may select that in 90% of the outcomes for the "all okay, fast" service request results, the simulated users will behave (i.e., respond) as per usual. In 9% of the outcomes, illustrative embodiments may select a random service error user response. In 1% of the outcomes, illustrative embodiments may select a user response entirely at random out of the user behavior profile.

In the illustrative example above, illustrative embodiments would generate 90% of the 4900 (i.e., 4410) user responses as usual and push the 4410 usual user responses into the service request chunk for the next load test run cycle. Illustrative embodiments would switch 9% of the 4900 (i.e., 441) user responses to a single, randomly selected service error user response. In 1% of the 4900 (i.e., 49) user responses, illustrative embodiments would select a single completely random user response from the user behavior profile. As a result, in this illustrative example, instead of having to generate user response service interactions for 5000 simulated users in the entire cohort, illustrative embodiments only generate user responses for 3 simulated user agents, each simulated user agent representing a given percentage of user responses in the cohort. In other words, the first agent represents 90% of the user responses in the cohort, the second agent represents 9% of the user responses in the cohort, and the third agent represents 1% of the user responses in the cohort.

If service requests are still pending and already in the pending service request queue for the next load test run cycle, then illustrative embodiments may decrease the number of service requests generated accordingly. For example, if 400 service requests are still pending in the pending service request queue, then illustrative embodiments may only generate 4600 service requests for the next load test run cycle. Alternatively, illustrative embodiments may ignore the 400 pending service requests from the previous load test run cycle in the queue and continue to generate the full 5000 service requests, if sufficient resources are available for the next load test run cycle. If sufficient resources are available, then illustrative embodiments will load test the service with a cumulative of 5400 service requests. This can be useful to determine a service's behavior when service requests are backing up.

Further, between load test run cycles, illustrative embodiments may change the composition of the cohorts to simulate or mimic real-world day cycles (e.g., different sets of users may utilize the online service during different time intervals of the day). Furthermore, illustrative embodiments repeat this process until, for example, the allotted time or number of load test run cycles has expired, the service exhibits too many failed service requests (e.g., 50% or more of all service requests fail), the service becomes entirely unresponsive for a defined period of time (e.g., down/unresponsive for more than 5 minutes), or the like. Using a probabilistic user behavior model to predetermine user responses to different service states for a larger cohort of simulated users, enables illustrative embodiments to generate cohort service request chunks accordingly, without the need to simulate all users in a cohort. Thus, illustrative embodiments are capable of simulating real-world users who have different personality types that tend to respond differently to a set of different service states an online service is tested with. As a result, illustrative embodiments generate an adaptive and speculative workload to load test a given online service.

Thus, illustrative embodiments provide one or more technical solutions that overcome a technical problem with static load testing of online services. As a result, these one or more technical solutions provide a technical effect and practical application in the field of online services by identifying and resolving issues with online services to increase performance using adaptive, speculative, agent-based workloads.

With reference now to FIG. 3, a diagram illustrating an example of a load test system is depicted in accordance with an illustrative embodiment. Load test system 300 may be implemented in a network of data processing systems, such as network data processing system 100 in FIG. 1. Load test system 300 is a system of hardware and software components for load testing online services.

In this example, load test system 300 includes service provider server 302 and load test server 304. Service provider server 302 and load test server 304 may be, for example, server 104 and server 106 in FIG. 1, respectively. Service provider server 302 hosts online service 306. Online service 306 may represent any type of online service provided to client device users. Online service 306 may also represent a set of different online services.

Load test server 304 includes load test manager 308, such as, for example, load test manager 218 in FIG. 2. Load test server 304 utilizes load test manager 308 to perform load testing of online services, such as online service 306. Load test server 304 also includes user behavior profile 310. In this example, user behavior profile 310 contains simulated user personality type 312, service states 314, endpoint location profile and URL list 316, rules 318, and simulated user responses 320. However, it should be noted that user behavior profile 310 is meant as an example only and may contain more or less information than shown. Further, user behavior profile 310 represents a plurality of different user behavior profiles corresponding to a plurality of different personality types.

Simulated user personality type 312 represents how the simulated user corresponding to user behavior profile 310 responds to service states 314. Simulated user personality type 312 may be, for example, an "Excessive Clicker" personality type. Service states 314 represent a plurality of different states of online service 306. Service states 314 may include any type and number of states corresponding to online service 306, such as, for example, user login, responsive, slow, error, user logout, and the like.

Endpoint location profile and URL list 316 contains a set of location profiles (e.g., different geographic regions and time zones) corresponding to a plurality of endpoints that access and utilize online service 306 and a set of URLs corresponding to each of service states 314. Rules 318 map service states 314 to simulated user responses 320. Simulated user responses 320 are predefined user responses to each different state in service states 314. Load test manager 308 utilizes one of single load generator 322 or clustered load generator 324 to send load test 326 to online service 306 using the information in each selected user behavior profile 310, which represents a userbase of online service 306, to perform load testing of online service 306.

With reference now to FIG. 4, a diagram illustrating an example of a behavior distribution table is depicted in accordance with an illustrative embodiment. Behavior distribution table 400 may be implemented in a load test manager, such as, for example, load test manager 218 in FIG. 2 or load test manager 308 in FIG. 3. Behavior Distribution table 400 indicates behavior of an entire cohort of simulated users.

In this example, behavior distribution table 400 includes input state 402, behavior distribution 404, and output state 406. Input state 402 represents a result of a previous service request. In this example, input state 402 includes state code and response time. However, it should be noted that input state 402 may include other information, such as, for example, response content type, response body, and the like.

The load test manager groups simulated user behavior by the same input state 402. For example, each table entry for "OK" state 408 comprises state code 200 with response time less than 50 milliseconds and each table entry for "SLOW" state 410 comprises state code 200 with response time greater than 500 milliseconds. In addition, the load test manager determines behavior distribution 404 by observed behavior occurrence for output state 406. In this example, behavior distribution 404 for output state 406 corresponding to "OK" state 408 is 0.9 (i.e., 90%) continue with URL list, 0.05 (i.e., 5%) repeat previous service request, and 0.05 (i.e., 5%) switch to a random other condition. Similarly, behavior distribution 404 for output state 406 corresponding to "SLOW" state 410 is 0.4 (i.e., 40%) repeat previous service request, 0.3 (i.e., 30%) repeat previous service request and bypass cache, 0.2 (i.e., 20%) switch to a timeout condition, and 0.1 (i.e., 10%) switch to an "Excessive Clicker" personality type/user behavior profile. It should be noted behavior distribution 404 within each behavior group should add up to 1.0 (i.e., 100%). The load test manager determines output state 406 based on rules, such as, for example, rules 318 in FIG. 3, combined behavior distribution 404.

Figure 5:
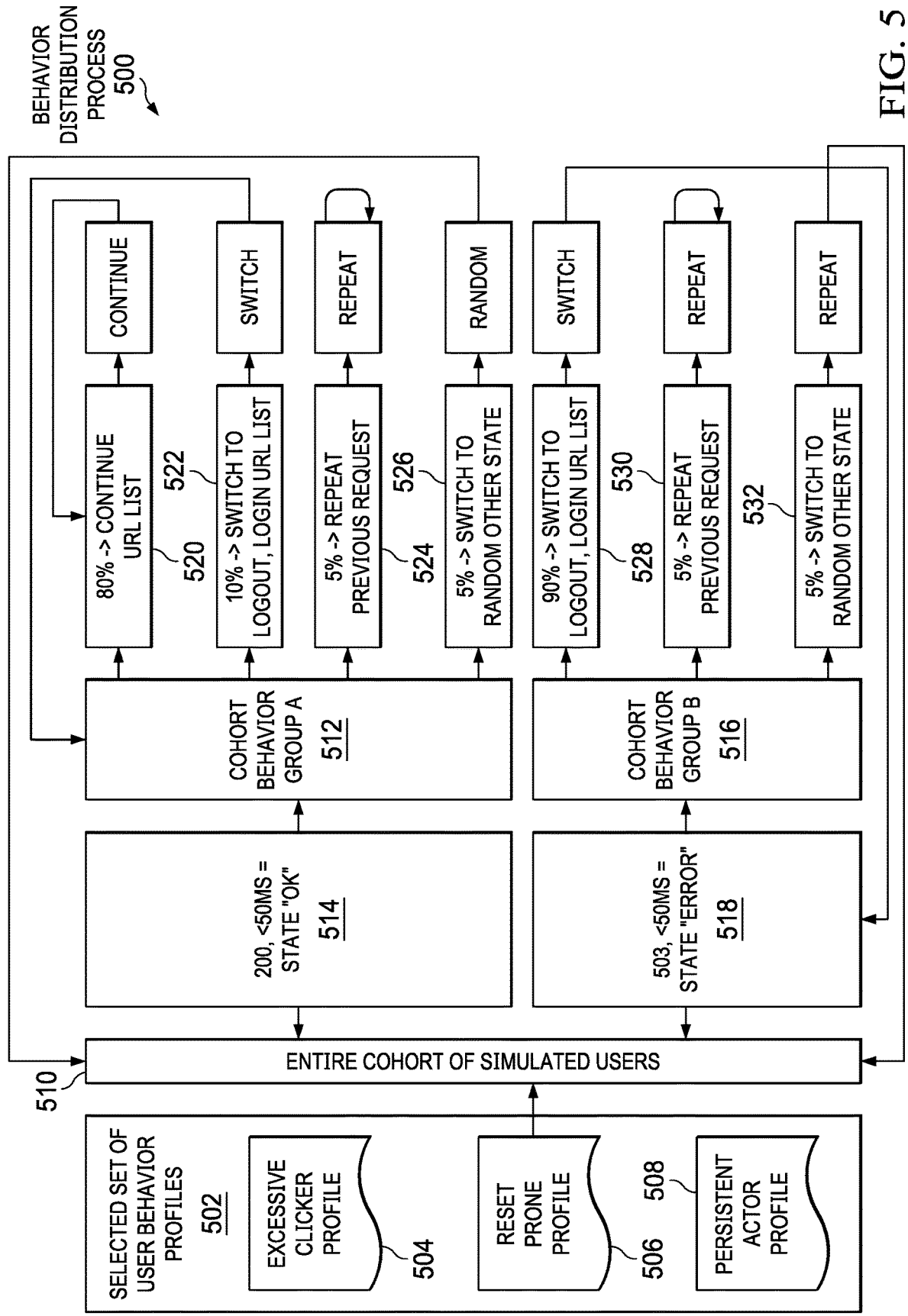
FIG. 5 is a diagram illustrating an example of a behavior distribution process in accordance with an illustrative embodiment.

With reference now to FIG. 5, a diagram illustrating an example of a behavior distribution process is depicted in accordance with an illustrative embodiment. Behavior distribution process 500 may be implemented in a load test manager, such as, for example, load test manager 218 in FIG. 2 or load test manager 308 in FIG. 3. Behavior distribution process 500 shows the distribution of behavior for entire cohort of simulated users 510.

The load test manager utilizes selected set of user behavior profiles 502 to represent a userbase of a particular online service, such as, for example, online service 306 in FIG. 3, which is to be load tested. In this example, selected set of user behavior profiles 502 includes "Excessive Clicker" user behavior profile 504, "Reset Prone" user behavior profile 506, and "Persistent Actor" user behavior profile 508. An "Excessive Clicker" simulated user, for example, has shortened delays between service requests and has a higher probability of performing frequent "force refresh" service requests. A "Reset Prone" simulated user, for example, considers any service errors as a "broken session", logs out of the online service, clears the cache, and then logs back in. A "Persistent Actor" simulated user, for example, continues forward in the URL list even when service requests fail or are slow. However, it should be noted that selected set of user behavior profiles 502 may include any number and type of user behavior profiles.

It should be noted that instead of simulating thousands of users, the load test manager folds entire cohort of simulated users 510 into individual simulated user agents (e.g., clusters of simulated users). Each simulated user agent represents all simulated users (e.g., threads/sessions), which are in a similar input state and a similar output state, within a particular cluster of simulated users. In other words, the load test manager generates one simulated user agent per cluster of simulated users and assigns behavior distribution for an entire cluster of simulated users with assignment within a behavior distribution being random. The load test manager executes results in all possible actions within the same behavior group according to that particular behavior group's corresponding behavior distribution.

In this example, the load test manager divides entire cohort of simulated users 510 into cohort behavior group "A" 512 based on one cluster of simulated users being in a similar input and output state (i.e., 200, <50 ms=State "OK") at 514 and cohort behavior group "B" 516 based on another cluster of simulated users being in a similar input and output state (i.e., 503, <50 ms=State "Error") at 518. Afterward, the load test manager assigns the behavior distribution of cohort behavior group "A" 512 as 80% continue with the URL list at 520, 10% switch to logout, login in the URL list at 522, 5% repeat previous service request at 524, and 5% switch to random other service state at 526. In addition, the load test manager assigns the behavior distribution of cohort behavior group "B" 516 as 90% switch to logout, login in the URL list at 528, 5% repeat previous service request at 530, and 5% switch to a random other service state at 532.

Figure 6:
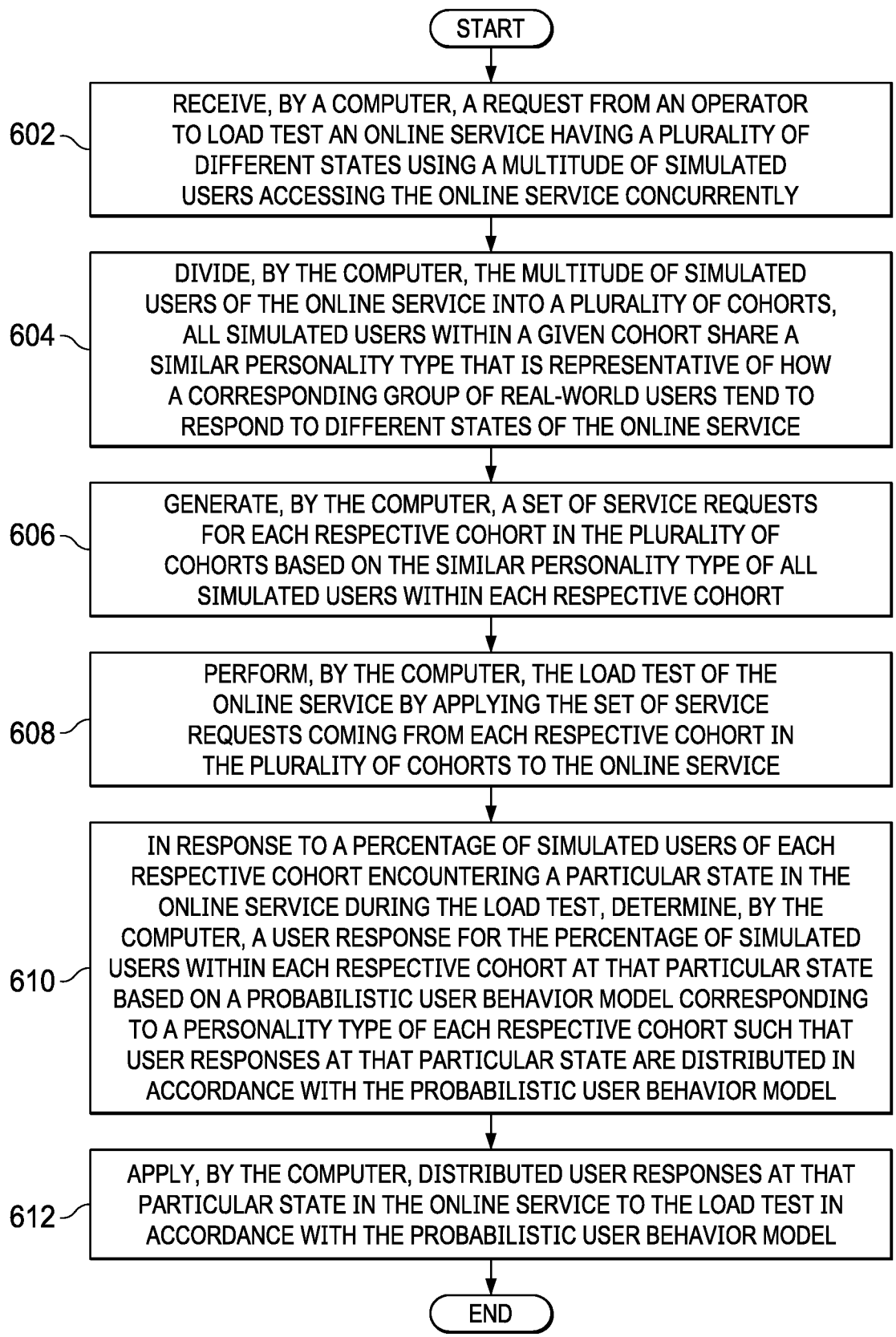
FIG. 6 is a flowchart illustrating a process for determining a particular user response to a service state during a load test of an online service in accordance with an illustrative embodiment.

With reference now to FIG. 6, a flowchart illustrating a process for determining a particular user response to a service state during a load test of an online service is shown in accordance with an illustrative embodiment. The process shown in FIG. 6 may be implemented in a computer, such as, for example, server 106 in FIG. 1, data processing system 200 in FIG. 2, or load test server 304 in FIG. 3. For example, the process shown in FIG. 6 may be implemented in load test manager 218 in FIG. 2 or load test manager 308 in FIG. 3.

The process begins when the computer receives a request from an operator to load test an online service having a plurality of different states using a multitude of simulated users accessing the online service concurrently (step 602). In response to receiving the request to load test the online service, the computer divides the multitude of simulated users of the online service into a plurality of cohorts (step 604). All simulated users within a given cohort share a similar personality type that is representative of how a corresponding group of real-world users tend to respond to different states of the online service. For example, a first cohort of simulated users may have an excessive clicker personality type that refreshes a webpage of the online service often when a service issue or service condition arises and a second cohort of simulated users may have a passive personality type that sits and waits for an extended period of time before responding to a service issue or service condition.

Afterward, the computer generates a set of service requests (e.g., a service request chunk) for each respective cohort in the plurality of cohorts based on the similar personality type of all simulated users within each respective cohort (step 606). Then, the computer performs the load test of the online service by applying the set of service requests coming from each respective cohort in the plurality of cohorts to the online service (step 608).

In response to a percentage of simulated users of each respective cohort encountering a particular state in the online service during the load test, the computer determines a user response for the percentage of simulated users within each respective cohort at that particular state based on a probabilistic user behavior model corresponding to a personality type of each respective cohort such that user responses at that particular state are distributed in accordance with the probabilistic user behavior model (step 610). For example, if the computer determines that 1000 simulated users of a cohort at a first service state "x" have a 90% probability of performing user response "A" and a 10% probability of performing user response "B" in response to encountering the first service state "x", then the computer moves 900 simulated users of that cohort to a second service state "y" corresponding to user response "A" and 100 simulated users of that cohort to a third service state "z" corresponding to user response "B". The computer applies distributed user responses at that particular state in the online service to the load test in accordance with the probabilistic user behavior model (step 612). Thereafter, the process terminates.

Figure 7:
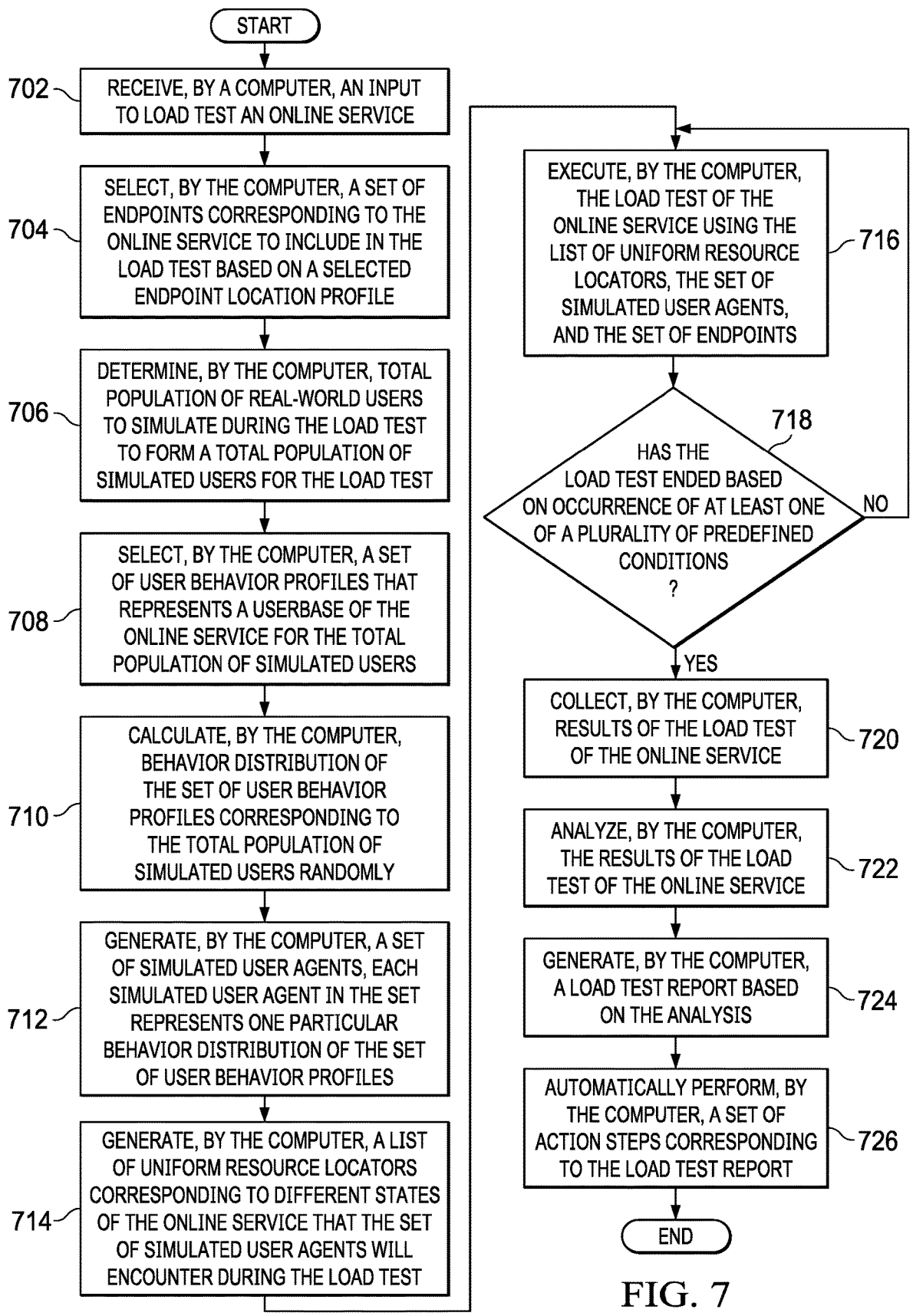
FIG. 7 is a flowchart illustrating a process for executing a load test of an online service in accordance with an illustrative embodiment.

With reference now to FIG. 7, a flowchart illustrating a process for executing a load test of an online service is shown in accordance with an illustrative embodiment. The process shown in FIG. 7 may be implemented in a computer, such as, for example, server 106 in FIG. 1, data processing system 200 in FIG. 2, or load test server 304 in FIG. 3. For example, the process shown in FIG. 7 may be implemented in load test manager 218 in FIG. 2 or load test manager 308 in FIG. 3.

The process begins when the computer receives an input to load test an online service (step 702). In response to receiving the input to load test the online service, the computer selects a set of endpoints corresponding to the online service to include in the load test based on a selected endpoint location profile (step 704). In addition, the computer determines total population of real-world users to simulate during the load test to form a total population of simulated users for the load test (step 706).

Further, the computer selects a set of user behavior profiles that represents a userbase of the online service for the total population of simulated users (step 708). Furthermore, the computer calculates behavior distribution of the set of user behavior profiles corresponding to the total population of simulated users randomly (step 710). Moreover, the computer generates a set of simulated user agents, each simulated user agent in the set represents one particular behavior distribution of the set of user behavior profiles (step 712). The computer also generates a list of uniform resource locators corresponding to different states of the online service that the set of simulated user agents will encounter during the load test (step 714).

Afterward, the computer executes the load test of the online service using the list of uniform resource locators, the set of simulated user agents, and the set of endpoints (step 716). The computer makes a determination as to whether the load test ended based on occurrence of at least one of a plurality of predefined conditions (step 718). The plurality of predefined conditions includes, for example, successful execution of each URL in the list of URLs, a predetermined number of service requests (e.g., 10) end in a failure state, service request response time is greater than a predetermined amount of time (e.g., 5 seconds) for more than a predetermined time interval (e.g., 5 minutes), the online service stops responding entirely (e.g., connection timeout/reset), and the like.

If the computer determines that the load test has not ended based on failure of at least one of the plurality of predefined conditions occurring, no output of step 718, then the process returns to step 716 where the compute continues to execute the load test of the online service. If computer determines that the load test has ended based on occurrence of at least one of the plurality of predefined conditions, yes output of step 718, then the computer collects results of the load test of the online service (step 720). In addition, the computer analyzes the results of the load test of the online service to identify any problems, such as, for example, network latency, bottlenecks, software issues, and the like, associated with the online service (step 722).

The computer generates a load test report identifying any problems associated with the online service based on the analysis (step 724). Further, the computer automatically performs a set of action steps corresponding to the load test report (step 726). The set of actions may include, for example, the computer automatically sending the load test report to a service operator corresponding to the online service for review and possible remediation of any identified problems. Moreover, the set of action steps may also include the computer automatically performing steps to resolve one or more of the identified problems by, for example, reducing network latency, removing bottlenecks, and the like. Thereafter, the process terminates.

Thus, illustrative embodiments of the present invention provide a computer-implemented method, computer system, and computer program product for load testing an online service using a plurality of simulated user cohorts having different personality types to simulate unpredictable, adaptive behavior of many users under different load scenarios during the load test. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for load testing a service having a plurality of different states, the computer-implemented method comprising:

dividing, by a computer, a multitude of simulated users accessing the service concurrently into a plurality of cohorts, all simulated users within a given cohort of the plurality of cohorts share a similar personality type that is representative of how a corresponding group of real-world users respond to the plurality of different states of the service;

performing, by the computer, a load test of the service by applying a set of service requests coming from each respective cohort in the plurality of cohorts to the service;

responsive to a percentage of simulated users of each respective cohort encountering a particular state in the service during the load test, determining, by the computer, a user response for the percentage of simulated users within each respective cohort at that particular state based on a probabilistic user behavior model corresponding to a personality type of each respective cohort such that user responses at that particular state are distributed in accordance with the probabilistic user behavior model; and applying, by the computer, distributed user responses at that particular state in the service to the load test in accordance with the probabilistic user behavior model.

2. The computer-implemented method of claim 1 further comprising:

generating, by the computer, the set of service requests for each respective cohort in the plurality of cohorts based on the similar personality type of all simulated users within each respective cohort.

3. The computer-implemented method of claim 1 further comprising:

selecting, by the computer, a set of endpoints corresponding to the service to include in the load test based on a selected endpoint location profile.

4. The computer-implemented method of claim 3 further comprising:

determining, by the computer, total population of real-world users to simulate during the load test to form a total population of simulated users for the load test; and selecting, by the computer, a set of user behavior profiles that represents a userbase of the service for the total population of simulated users.

5. The computer-implemented method of claim 4 further comprising:

calculating, by the computer, behavior distribution of the set of user behavior profiles corresponding to the total population of simulated users randomly; and generating, by the computer, a set of simulated user agents, each simulated user agent in the set represents one particular behavior distribution of the set of user behavior profiles.

6. The computer-implemented method of claim 5 further comprising:

generating, by the computer, a list of uniform resource locators corresponding to the plurality of different states of the service that the set of simulated user agents will encounter during the load test.

7. The computer-implemented method of claim 6 further comprising:

executing, by the computer, the load test of the service using the list of uniform resource locators, the set of simulated user agents, and the set of endpoints.

8. The computer-implemented method of claim 7 further comprising:

determining, by the computer, whether the load test ended based on occurrence of at least one of a plurality of predefined conditions, wherein the plurality of predefined conditions includes successful execution of each uniform resource locator in the list of uniform resource locators, a predetermined number of service requests end in a failure state, service request response time is greater than a predetermined amount of time for more than a predetermined time interval, and the service stops responding;

responsive to the computer determining that the load test has ended based on the occurrence of at least one of the plurality of predefined conditions, collecting, by the computer, results of the load test of the service;

analyzing, by the computer, the results of the load test of the service to identify any problems associated with the service; and generating, by the computer, a load test report identifying any problems associated with the service based on the analyzing.

9. The computer-implemented method of claim 8 further comprising:
performing, by the computer, a set of action steps corresponding to the load test report identifying any problems associated with the service automatically.

10. A computer system for load testing a service having a plurality of different states, the computer system comprising:
a bus system;
a storage device connected to the bus system, wherein the storage device stores program instructions; and
a processor connected to the bus system, wherein the processor executes the program instructions to:
divide a multitude of simulated users accessing the service concurrently into a plurality of cohorts, all simulated users within a given cohort of the plurality of cohorts share a similar personality type that is representative of how a corresponding group of real-world users respond to the plurality of different states of the service;
perform a load test of the service by applying a set of service requests coming from each respective cohort in the plurality of cohorts to the service;
when a percentage of simulated users of each respective cohort encountering a particular state in the service during the load test, determine a user response for the percentage of simulated users within each respective cohort at that particular state based on a probabilistic user behavior model corresponding to a personality type of each respective cohort such that user responses at that particular state are distributed in accordance with the probabilistic user behavior model; and
apply distributed user responses at that particular state in the service to the load test in accordance with the probabilistic user behavior model.

11. The computer system of claim 10, wherein the processor further executes the program instructions to:
generate the set of service requests for each respective cohort in the plurality of cohorts based on the similar personality type of all simulated users within each respective cohort.

12. The computer system of claim 10, wherein the processor further executes the program instructions to:
select a set of endpoints corresponding to the service to include in the load test based on a selected endpoint location profile.

13. The computer system of claim 12, wherein the processor further executes the program instructions to:
determine total population of real-world users to simulate during the load test to form a total population of simulated users for the load test; and
select a set of user behavior profiles that represents a userbase of the service for the total population of simulated users.

14. A computer program product for load testing a service having a plurality of different states, the computer program product comprising a computer readable storage medium having program instructions embodied therewith, the program instructions executable by a computer to cause the computer to perform a method of:
dividing, by the computer, a multitude of simulated users accessing the service concurrently into a plurality of cohorts, all simulated users within a given cohort of the plurality of cohorts share a similar personality type that is representative of how a corresponding group of real-world users respond to the plurality of different states of the service;
performing, by the computer, a load test of the service by applying a set of service requests coming from each respective cohort in the plurality of cohorts to the service;
responsive to a percentage of simulated users of each respective cohort encountering a particular state in the service during the load test, determining, by the computer, a user response for the percentage of simulated users within each respective cohort at that particular state based on a probabilistic user behavior model corresponding to a personality type of each respective cohort such that user responses at that particular state are distributed in accordance with the probabilistic user behavior model; and
applying, by the computer, distributed user responses at that particular state in the service to the load test in accordance with the probabilistic user behavior model.

15. The computer program product of claim 14 further comprising:
generating, by the computer, the set of service requests for each respective cohort in the plurality of cohorts based on the similar personality type of all simulated users within each respective cohort.

16. The computer program product of claim 14 further comprising:
selecting, by the computer, a set of endpoints corresponding to the service to include in the load test based on a selected endpoint location profile.

17. The computer program product of claim 16 further comprising:
determining, by the computer, total population of real-world users to simulate during the load test to form a total population of simulated users for the load test; and
selecting, by the computer, a set of user behavior profiles that represents a userbase of the service for the total population of simulated users.

18. The computer program product of claim 17 further comprising:
calculating, by the computer, behavior distribution of the set of user behavior profiles corresponding to the total population of simulated users randomly; and
generating, by the computer, a set of simulated user agents, each simulated user agent in the set represents one particular behavior distribution of the set of user behavior profiles.

19. The computer program product of claim 18 further comprising:
generating, by the computer, a list of uniform resource locators corresponding to the plurality of different states of the service that the set of simulated user agents will encounter during the load test.

20. The computer program product of claim 19 further comprising:
executing, by the computer, the load test of the service using the list of uniform resource locators, the set of simulated user agents, and the set of endpoints.

* * * * *